US012735985B2

(12) United States Patent
Cohn et al.

(10) Patent No.: US 12,735,985 B2
(45) Date of Patent: Sep. 15, 2026

(54) MILLIMETER-WAVE DIRECTED-ENERGY EXCAVATION

(71) Applicants: Massachusetts Institute of Technology, Cambridge, MA (US); Regency Technologies LLC, Tulsa, OK (US)

(72) Inventors: Daniel Cohn, Cambridge, MA (US); Paul P. Woskov, Bedford, MA (US); Herbert Einstein, Belmont, MA (US); Kenneth Oglesby, Skiatook, OK (US)

(73) Assignees: Massachusetts Institute of Technology, Cambridge, MA (US); Regency Technologies LLC, Tulsa, OK (US)

( * ) Notice: Subject to any disclaimer, the term of this patent is extended or adjusted under 35 U.S.C. 154(b) by 828 days.

(21) Appl. No.: 18/059,799

(22) Filed: Nov. 29, 2022

(65) Prior Publication Data

US 2025/0354489 A1 Nov. 20, 2025

(51) Int. Cl.

| | |
|---|---|
| ***E21B 7/15*** | (2006.01) |
| ***E21B 7/14*** | (2006.01) |
| ***E21C 33/00*** | (2006.01) |
| ***E21C 37/16*** | (2006.01) |
| ***E21C 45/00*** | (2006.01) |
| ***H05B 6/80*** | (2006.01) |

(52) U.S. Cl.

CPC ................ *E21C 37/16* (2013.01); *E21B 7/14* (2013.01); *E21B 7/15* (2013.01); *E21C 33/00* (2013.01); *E21C 45/00* (2013.01); *H05B 6/80* (2013.01)

(58) Field of Classification Search

CPC ............... E21B 7/14; E21B 7/15; E21C 37/16

See application file for complete search history.

(56) References Cited

U.S. PATENT DOCUMENTS

| | | | |
|---|---|---|---|
| 5,003,144 | A | 3/1991 | Lindroth et al. |
| 5,824,133 | A | 10/1998 | Tranquilla |
| 8,393,410 | B2 | 3/2013 | Woskov et al. |
| 9,453,373 | B2 | 9/2016 | Shnell |
| 9,890,594 | B2 | 2/2018 | Hanback |
| 10,494,870 | B2 | 12/2019 | Hanback |
| 2002/0019524 | A1 | 2/2002 | Cottrell et al. |
| 2003/0112431 | A1 | 6/2003 | Ketkar |
| 2007/0068242 | A1 | 3/2007 | DiFoggio |

(Continued)

FOREIGN PATENT DOCUMENTS

| | | | |
|---|---|---|---|
| DE | 102007060409 A1 * | 6/2009 | ............. E21B 7/046 |
| WO | 2019046689 A1 | 3/2019 | |

OTHER PUBLICATIONS

International Search Report and Written Opinion in International Appl. No. PCT/US2023/081543 mailed Jun. 26, 2024, 16 pages.

(Continued)

*Primary Examiner* — Sunil Singh

(74) *Attorney, Agent, or Firm* — Smith Baluch LLP

(57) ABSTRACT

Apparatus and methods are described for excavating earthen material with millimeter-wave (MMW) radiation or a combination of MMW radiation and mechanical apparatus. The MMW radiation can reduce costs and hazards associated with excavation using mechanical means only and/or explosives. MMW-assisted excavation has significant energy advantages over optical or long-wavelength microwave excavation techniques.

20 Claims, 7 Drawing Sheets

(56) References Cited

U.S. PATENT DOCUMENTS

| | | | |
|---|---|---|---|
| 2008/0037010 | A1 | 2/2008 | Rafac |
| 2009/0321132 | A1 | 12/2009 | Ouellet et al. |
| 2010/0055807 | A1 | 3/2010 | Srivastava et al. |
| 2010/0181471 | A1 | 7/2010 | Pop et al. |
| 2010/0252324 | A1 | 10/2010 | Woskov et al. |
| 2014/0041940 | A1 | 2/2014 | Shnell |
| 2014/0157877 | A1 | 6/2014 | Abad et al. |
| 2015/0345225 | A1 | 12/2015 | Kocis |
| 2018/0209218 | A1 | 7/2018 | Hanback |
| 2020/0048967 | A1 | 2/2020 | Batarseh |
| 2021/0164332 | A1 | 6/2021 | Skinner et al. |
| 2021/0277751 | A1 | 9/2021 | Xu et al. |

OTHER PUBLICATIONS

Woskov et al. Annual Report 2009 Millimeter Wave Deep Drilling for Geothermal Energy, Natural Gas and Oil researchgate.net. Sep. 30, 2009. [Oct. 6, 2024]. Retreived from internet: URL:https://www.researchgate.net. Sep. 30, 2009. [Oct. 6, 2024]. publication/279809817_Annual_Report_2009_Millimeter_Wave_ Deep_Drilling_ For_Geothermal_Energy_Natural_Gas and_Oil_M links/5a26c4b2a6fdcc8e866e35b0/Annual-Report-2009-Millimeter-Wave-Deep-Drilling-For-Geothermal-Energy-Natural-Gas-and-Oil-MITEI-Seed-Fund-Program.pdf, 8 pages.

Doane, "Parabolic Tapers for Overmoded Waveguides," International Journal of Infrared and Millimeter Waves, 5.5 (1984):737-751.

Hassani et al. "The development of microwave assisted machineries to break hard rocks." Proceedings of the 28th International Symposium on Automation and Robotics in Construction, Seoul, South Korea 2011, 7 pages.

International Search Report and Written Opinion in International Application No. PCT/US2022/078254 mailed Jan. 17, 2023, 13 pages.

International Search Report and Written Opinion in International Application No. PCT/US2022/078255 mailed Mar. 10, 2023, 13 pages.

Monchusi "Microwave-assisted rock breaking modelling and application." CSIR Centre for Mining Innovation, Oct. 2012, 1 page.

Petrov, New Applications of Radio Electronics: Weakening Rocks with Powerful Microwaves, Radio electronics and telecommunications, No. 2, 2002 pp. 35-41 Russia.

Petrov, Weakening Rocks with Powerful Electromagnetic Microwave Field, Informost "Radioelectronics and Telecommunications" 2002, 19 pages.

Prokopenko, "Microwave heating for emolliating and fracture of rocks." Advances in Induction and Microwave Heating of Mineral and Organic Materials. IntechOpen, 2011, 27 pages.

Salsman et al. Short-pulse microwave treatment of disseminated sulfide ores. Mineral Eng., 1996, 9, No. 1, c. 43-54.

Schaub et al., "Simple Expressions for the Design of Linear Tapers in Overmoded Corrugated Waveguides," Journal of Infrared, Millimeter, and Terahertz Waves 37 (2016): 100-110.

Walkiewicz et al. "Microwave-assisted grinding." IEEE Transactions on Industry Applications 27.2 (1991): 239-243.

Walkiewicz et al., "Microwave-assisted grinding," Conference Record of the IEEE Industry Applications Society Annual Meeting, vol. 2, doi: 10.1109/IAS.1989.96845, 1989, pp. 1528-1532.

Woskov, "A Reflected Power Isolator for a 10 kW, 28 GHz Gyrotron," Microwave Symposium Digest (IMS), 2013 IEEE MTT-S International, Seattle, WA, Jun. 2-7, 2013, 3 pages.

Woskov et al., "Millimeter-Wave Monitoring for Nuclear Waste Vitrification." Nuclear Waste Research: Siting, Technology and Treatment (2008): 75-105.

Woskov et al., "Drilling and Fracturing with Millimeter-Wave Directed Energy," MIT Plasma Science and Fusion Center Report, Dec. 2008, 7 pages.

Woskov et al., "Millimeter-Wave Heating, Radiometry, and Calorimetry of Granite Rock to Vaporization," Journal of Infrared, Millimeter, and Terahertz Waves 33 (2012): 82-95, 16 pages.

Woskov et al., "High Temperature 2-D Millimeter-Wave Radiometry of Micro Grooved Nuclear Graphite," Proceedings MRS2012 Fall Meeting, Boston, Mass., 2012, 6 pages.

Woskov et al., Millimeter-Wave Radiometer Diagnostics of Harmonic Electron Cyclotron Emission in the Levitated Dipole Experiment, Review of Scientific Instruments 81.10 (2010): 10D910, 4 pages.

Woskov et al., "Penetrating Rock with Intense Millimeter-Waves," 2014 39th International Conference on Infrared, Millimeter, and Terahertz Waves, (IRMMW-THz 2014), IEEE, 2014, 2 pages.

Woskov, Notch Filter Options for ITER Stray Gyrotron Radiation (2015), 1 page.

First Examiner's Report in Australian App. No. 2023414978 dated Sep. 24, 2025, 2 pages.

* cited by examiner

MILLIMETER-WAVE DIRECTED-ENERGY EXCAVATION

GOVERNMENT SUPPORT

This invention was made with government support under DE-SC0012308 awarded by the U.S. Department of Energy. The Government has certain rights in the invention.

BACKGROUND

Lasers and long-wavelength microwave sources have been considered for mining applications. Lasers, which have electromagnetic wavelengths shorter than about 10-5 m in the infrared and optical range, have drawbacks that include low electrical-to-laser power conversion efficiency, very short penetration lengths in earthen materials such as soil, sediment, or rock, and a high degree of scattering from airborne particles. Long-wavelength microwaves, which have wavelengths longer than about 0.1 m and are used in communication and heating/cooking, have drawbacks of not being able to provide small-area collimated and focused beams, high electric field strengths, and intense localized heating.

SUMMARY

A high-power millimeter-wave (MMW) excavation beam produced by a powerful MMW source (such as a gyrotron) can excavate or assist in excavation of earthen material by fracturing, melting, and/or vaporizing the earthen material at an excavation site. Because MMW radiation is used, sufficiently high power densities and electrical fields for fracturing, melting, and/or vaporizing the earthen material can be delivered efficiently to volumes of earthen material that would not be possible using optical radiation or long-wavelength microwave radiation.

Some implementations relate to an MMW excavation system for excavating earthen material. The system can comprise: a millimeter-wave (MMW) source configured to generate and output MMW radiation having a free-space wavelength in a range from 0.1 millimeter (mm) to 30 mm; and a transmission line, coupled to the MMW source, to guide the MMW radiation to an excavation site having the earthen material and to launch the guided MMW radiation as an excavation beam from a distal end of the transmission line into the earthen material. The MMW source and the transmission line can be configured to deliver at least 10 $kW/cm^2$ of the MMW radiation in the excavation beam to the excavation site such that the earthen material at the excavation site is at least fractured by the excavation beam, and the MMW source and/or the transmission line can be further configured to move the distal end of the transmission line in a first direction that is perpendicular to a second direction in which the excavation beam propagates to the excavation site.

Some implementations relate to a method of excavating earthen material using MMW radiation. The method can include acts of: generating, with a millimeter-wave (MMW) source, MMW radiation having a free-space wavelength in a range from 0.1 mm to 30 mm; coupling the MMW radiation to a transmission line; guiding, with the transmission line, the MMW radiation to an excavation site having the earthen material; forming an excavation beam from the MMW radiation at a distal end of the transmission line; illuminating the earthen material at the excavation site with the excavation beam at an irradiance of at least 10 $kW/cm^2$; fracturing the earthen material at the excavation site with the excavation beam; and removing, with mechanical apparatus, the earthen material fractured by the excavation beam from the excavation site.

Some implementations relate to a method of excavating a tunnel through earthen material using MMW radiation. The method can include acts of: generating, with a millimeter-wave (MMW) source, MMW radiation; coupling the MMW radiation to a transmission line; guiding, with the transmission line, the MMW radiation to an excavation site on a surface of the earthen material; directing an excavation beam, formed from the MMW radiation at a distal end of the transmission line, toward the earthen material at the excavation site; melting the earthen material at the excavation site with the excavation beam to form molten earthen material; and sealing a pore in a surface of the tunnel with the molten earthen material to prevent water from flowing through the pore.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. Terminology explicitly employed herein that also may appear in any disclosure incorporated by reference should be accorded a meaning most consistent with the particular concepts disclosed herein.

BRIEF DESCRIPTION OF DRAWINGS

The drawings are primarily for illustrative purposes and are not intended to limit the scope of the inventive subject matter. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
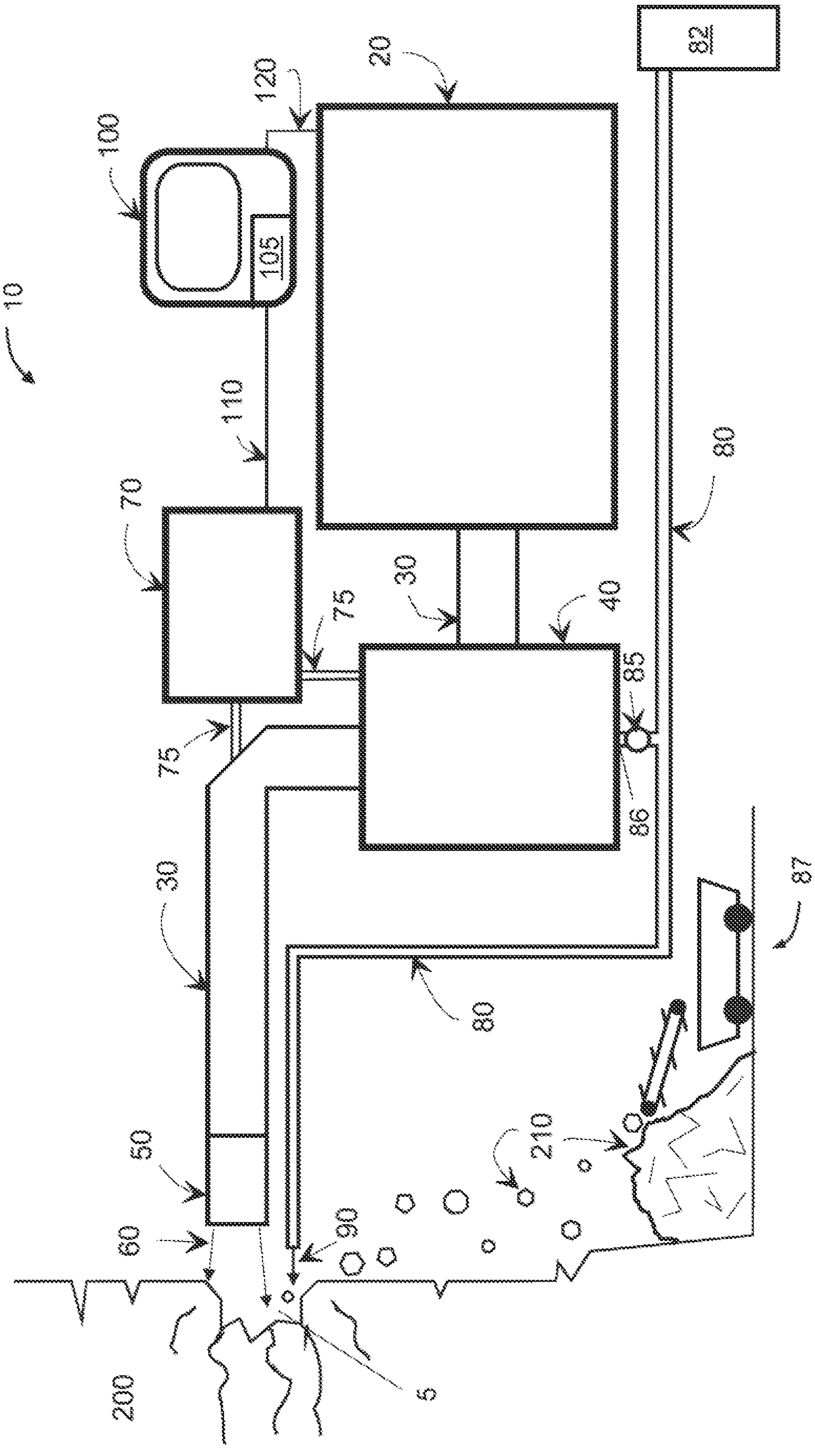
FIG. 1 depicts an MMW excavation system for excavating earthen material.

MMW radiation offers advantages over optical and long-wavelength microwave radiation for excavation of earthen material. High-power sources (such as gyrotrons) are available to deliver at least 10 kW and up to 2 MW of MMW radiation in a continuous beam of energy, or even deliver higher peak power levels when the source is pulsed. Because of the available wavelength range (e.g., from 0.1 millimeter (mm) to 30 mm) the beam can be focused to a small area at the excavation site (e.g., from 1 $cm^2$ to 100 $cm^2$) to produce higher intensity fields compared to long-wavelength microwaves. Further, the majority of energy of the MMW excavation beam can be deposited and absorbed in a depth of earthen material from 0.1 cm up to 20 cm, a much smaller depth than possible with long-wavelength microwaves and much deeper than with optical radiation. In some cases, any percentage from 50% up to 95% of the energy of the MMW excavation beam can be deposited and absorbed in a depth of earthen material from 0.1 cm up to 20 cm. The high power concentration in earthen material can cause electromagnetic, thermal, or pressure stresses (or some combination of these stresses) that fracture, melt, and/or even vaporize rock in some cases. Such high power concentration in earthen material is not possible with long-wavelength microwave radiation.

Although optical radiation can melt and vaporize rock, it suffers from smaller working volumes (due to short penetration depths) and lower electrical-to-optical power conversion efficiency than MMW radiation. Additionally, optical scattering from particulates ablated from the excavation site can significantly decrease the amount of optical radiation available for excavation.

For some applications, MMW sources can have frequencies approximately or exactly between 20 Gigahertz (GHz) and 500 GHz corresponding to wavelengths of 15 mm to 0.6 mm. A single gyrotron source can provide up to two megawatts (MW) of continuous wave (CW) power at 95 GHz, more than 20 times that of a CW heat-processing microwave source at 2.45 GHz or about 4 times more than that of an infrared, CW fiber laser. Electrical-to-MMW-radiation conversion efficiency is relatively high, over 50%, greater than that of a fiber laser. MMW sources can produce power intensities in rock that are 10 to 100 times larger than possible with microwave sources and over areas that are 4 to 100 times larger than possible with an infrared laser and significantly deeper than possible with an infrared laser. For example, deposition of 25 kW/$cm^2$ continuously over an area of 80 $cm^2$ could be achieved to a depth as large as 20 cm in a single exposure. By comparison, a 500-kW fiber laser would provide the same intensity over a 20 $cm^2$ area to a depth of a few millimeters in a single exposure, provided particulates ablated from the excavation site do not significantly interfere with the optical beam's propagation to the earthen material to be excavated. A single exposure can weaken, fracture, and/or melt a quantity of virgin earthen material within the absorption depth of the excavating beam at the excavation site.

FIG. 1 depicts an excavation system 10 for excavating earthen material. The system includes a high-power MMW source 20 and a beam-guiding transmission line 30 to guide MMW radiation from the MMW source 20 to an excavation site 5 in earthen material 200. The system can further include a beam conditioning and isolation system 40, monitoring instrumentation 70 to monitor conditions at the excavation site 5, and a coupling interface 75 to couple signals used for monitoring conditions at the excavation site 5 from and/or to the transmission line 30. The excavation system 10 can optionally further include data acquisition electronics 105, a controller 100, a data acquisition connection to the monitoring instrumentation 70, and a control line 120 that communicatively couples the controller 100 to the MMW source 20 so that the MMW source 20 can be controlled remotely and/or automatically by the controller 100. The excavation system 10 can further include a gas flow line 80 and a gas flow valve 85 to fluidically couple the gas flow line 80, via a gas inlet 86, to the transmission line 30. Gas can be injected from the flow line 80 through the valve 85 and gas inlet 86 into the transmission line 30. Introducing gas into the transmission line 30 can prevent unwanted backflow of particulates and/or vapor from the excavation site 5 to the source 20 and monitoring instrumentation 70.

The MMW source 20 (e.g., a gyrotron) can operate in a continuous mode to output MMW radiation at high powers (e.g., from 10 kW up to 2 MW) continuously. For some applications, the MMW source 20 can operate in pulsed mode to output a series of pulses, each having higher peak powers than 10 KW or up to 2 MW. The intensity (power/$cm^2$) delivered to the excavation site 5 can be set by selecting a power level and beam size at the excavation site.

The transmission line 30 can comprise a hollow cylindrical waveguide formed from a highly conductive material, such as copper. Other waveguide shapes (rectangular, square, etc.) and materials (aluminum, copper-coated steel, etc.) are also possible. The MMW source 20 and/or the transmission line 30 are further configured to move the distal end 50 of the transmission line in a first direction that is perpendicular to a second direction in which the excavation beam 60 propagates to the excavation site 5 (e.g., in a direction parallel to the surface of the earthen material 200 such that the diameter of a hole in the earthen material can be increased or so that trenches can be formed in the earthen material). In some implementations, at least a portion of the transmission line (e.g., the distal end 50) is moveable with respect to the MMW source 20 and the earthen material 200, without moving the MMW source. For example, the transmission line 30 may include one or more rotatable couplers or rotatable miter bends and one or more sliding sections (which also may be rotatable) such that the MMW excavating beam 60 launched from the distal end 50 can be scanned across the surface of the earthen material 200, moving laterally and/or vertically. In some cases, beam launch equipment (such as a mirror, lens, antenna, window, or some combination thereof) can be used at the distal end 50 of the transmission line 30 to collimate or focus the excavation beam 60 at the excavation site 5 and protect the transmission line. Alternatively, or additionally, the distal end 50 of the transmission line 30 can be tapered to reduce the size of the excavation beam 60 at the excavation site 5.

The excavation site 5 is a region of earthen material 200 irradiated by the MMW excavation beam 60 that is launched from the distal end 50 of the transmission line 30. A gas jet 90 can be ejected from an end of the gas flow line 80 at the excavation site 5 to blow fractured and melted earthen material 200 from the excavation site, which may produce an accumulation of mined material 210. A pressure source 82 (e.g., a mechanical pump or turbine) can provide a source of pressurized gas to the gas flow line 80 for blowing away excavated debris from the excavation site 5. The mined material 210 may be further removed by additional mechanical means 87 (e.g., a conveyor, auger, automated cart, or other apparatus). In some cases, mechanical means (e.g., a boring machine) can be used to remove weakened earthen material 200 from the excavation site. In some implementations, the excavation system 10 of FIG. 1 can further be used for rock weakening of removed rock in the size-reduction processing phase of excavation.

The beam conditioning and isolation system 40, monitoring instrumentation 70, and coupling interface 75 can be used to protect the source from powerful reflections from the excavation site 5 and to monitor conditions at the excavation site, as described in international Patent application No. PCT/2022/078254 titled "Continuous Emissions Monitor for Directed-Energy Borehole Drilling," filed Oct. 18, 2022 and in international Patent application No. PCT/2022/078255 titled "Rate of Penetration Depth Monitor for a Millimeter-Wave Beam Made Hole," filed Oct. 18, 2022, both of which applications are incorporated herein by reference in their entirety.

Figure 2A:
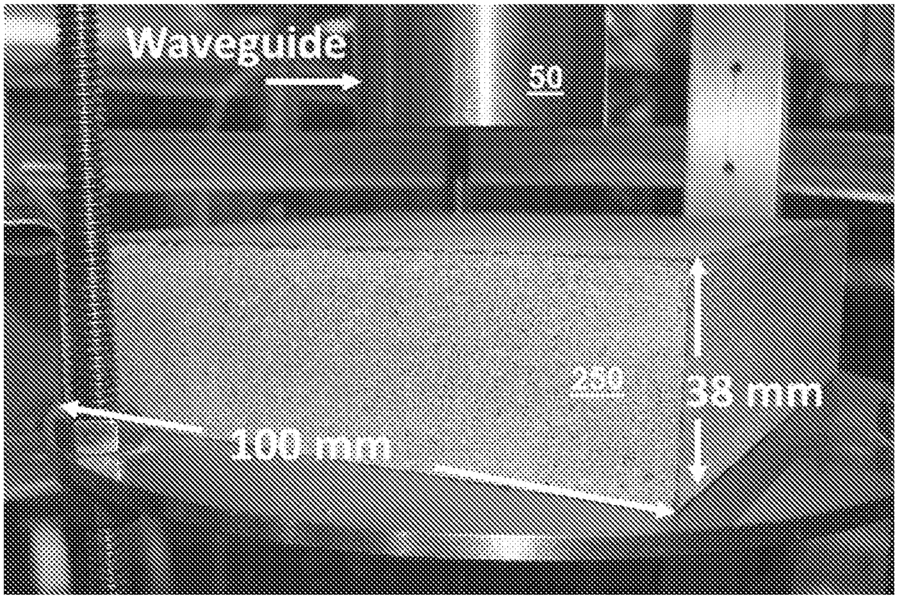
FIG. 2A shows a distal end of a waveguide that can launch an MMW excavation beam into a block of solid rock.
Figure 2B:
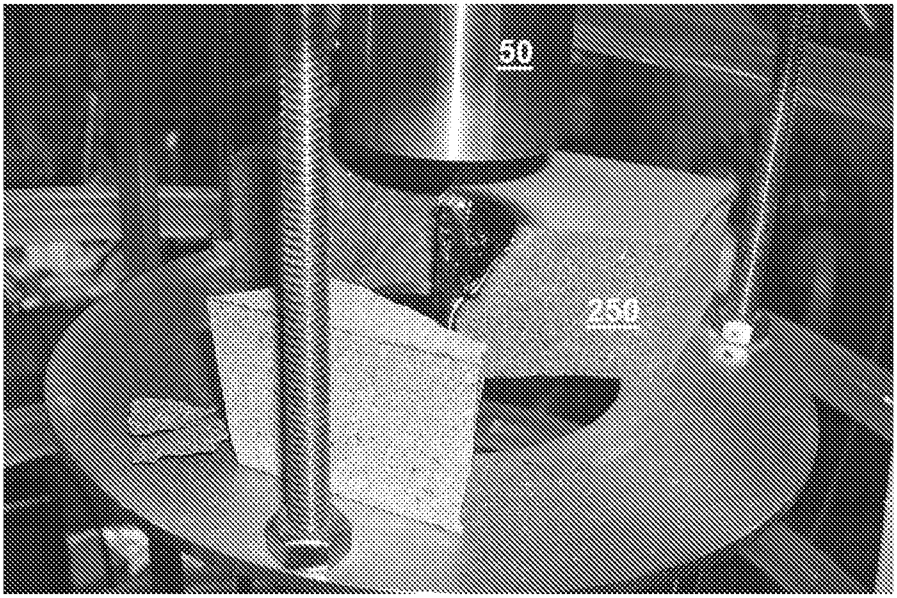
FIG. 2B shows fracture and melting of the solid rock of FIG. 2A by the MMW excavation beam.

FIGS. 2A and 2B show the effectiveness of a millimeter-wave excavation system 10 of FIG. 1 to break rock without mechanical contact or chemical means such as explosives. The thermal stress generated by rapidly heating a localized spot to a temperature above the rock melting temperature (>1,100° C.) adjacent to unheated rock causes the solid basalt rock 250 in FIG. 2A to melt and break apart as can be seen in FIG. 2B. In this example, a 4 kW, 28 GHz excavation beam diffracts to a size of 40 mm diameter after being launched from a distal end 50 of a 20-mm-inside-diameter, cylindrical waveguide. The basalt rock shatters after a few minutes' exposure to the excavation beam.

The appropriate operating frequency of the MMW source 20 for various applications will depend on the type of earthen material (solid rock, rock composition, gravel, sediment, sand, frozen tundra, etc.) and the particular application (weakening, fracturing, or melting of the particular earthen material). Operation at the lower end of the millimeter wave range (and perhaps even somewhat lower, e.g., 14 GHz) may be desirable in terms of penetration length into the rock and reduction of the complexity and power requirement of the gyrotron magnet system.

One application of MMW excavation with the MMW excavation system 10 is in the rock removal stage where it would weaken or break up earthen material 200 prior to mechanical removal. The MMW rock weakening would reduce demands on the mechanical systems for material removal (e.g., lower stresses and reduce wear on mechanical removal systems) and may reduce the need for human participation in the rock removal process. The MMW rock weakening could also accelerate the removal process by allowing mechanical removal systems to excavate rock or earthen material more quickly.

Purely mechanical breaking of rock (without explosives) is often done with full face or partial face tunnel boring machines (TBMs). Weakening the earthen material with the MMW excavation system 10, essentially through the introduction of cracks formed from rapid heating of the rock, before excavation with a TBM would increase the advance rate of the TBM. MMW directed energy could be used for such weakening without mechanical contact.

The MMW rock weakening could be used in combination with a mechanical grinding tool, vibration, cavitation, water jet, or a jet of gas (or some combination of these approaches) for rock removal. A scanning system for the excavation beam 60 can be used to select an appropriate distance between the earthen material 200 at the excavation site 5 and the distal end 50 of the transmission line 30. A selected distance between the earthen material 200 and distal end 50 can be in a range from 10 mm to 300 mm. The scanning system can include rotatable couplers or rotatable miter bends and slidable sections of the transmission line 30 that are controlled with stepper motors, for example. The size and scan rate of the MMW excavation beam can be controlled with the scanning system to provide the desired power density and amount of heating required for weakening and/or breaking up various types of rock. Other parameters that could be varied include whether CW or pulsed operation of the MMW radiation source 20 is used, the pulse repetition rate and power level of MMW radiation output from the MMW source 20. Frequency can also be varied with specialized gyrotron sources to control penetration depth and interaction with specific nonuniformities within the rock formation.

Both open and closed loop control can be utilized to adjust various system parameters (e.g., power level, pulse repetition rate, MMW frequency, distance between earthen material 200 and distal end 50 of the transmission line 30, etc.) to improve the effectiveness of the MMW heating and excavation. The closed loop control utilizes real time measurements of rock parameters. These parameters include temperature at the excavation site 5, where the temperature could be measured by an MMW radiometer. Monitored parameters can also include removal rate which could be measured using MMW radar and/or using long-wavelength microwave radar techniques and spectroscopic chemical analysis which could be measured using radiative emissions from the excavation site 5.

A second application for the excavation system 10 is the drilling of holes for rock excavation. Drill and blast operation is the standard process used to excavate rock. Drill holes (usually between 2 and 5 cm diameter, larger in excavation and mining) are drilled at penetration rates of about 2 m/minute. The drilling parameters (e.g., at least one of power, beam size, pulse duration, pulse repetition rate, drilling rate) can be adjusted to avoid excessive pressures in the hole that would break up or deform the hole. The holes are then filled with explosives to explode rock from the work area. An MMW excavation beam 60 from the excavation system 10 may be use do drill holes for placement of explosives faster and at lower cost without the need for mechanical drilling equipment.

Figure 3:
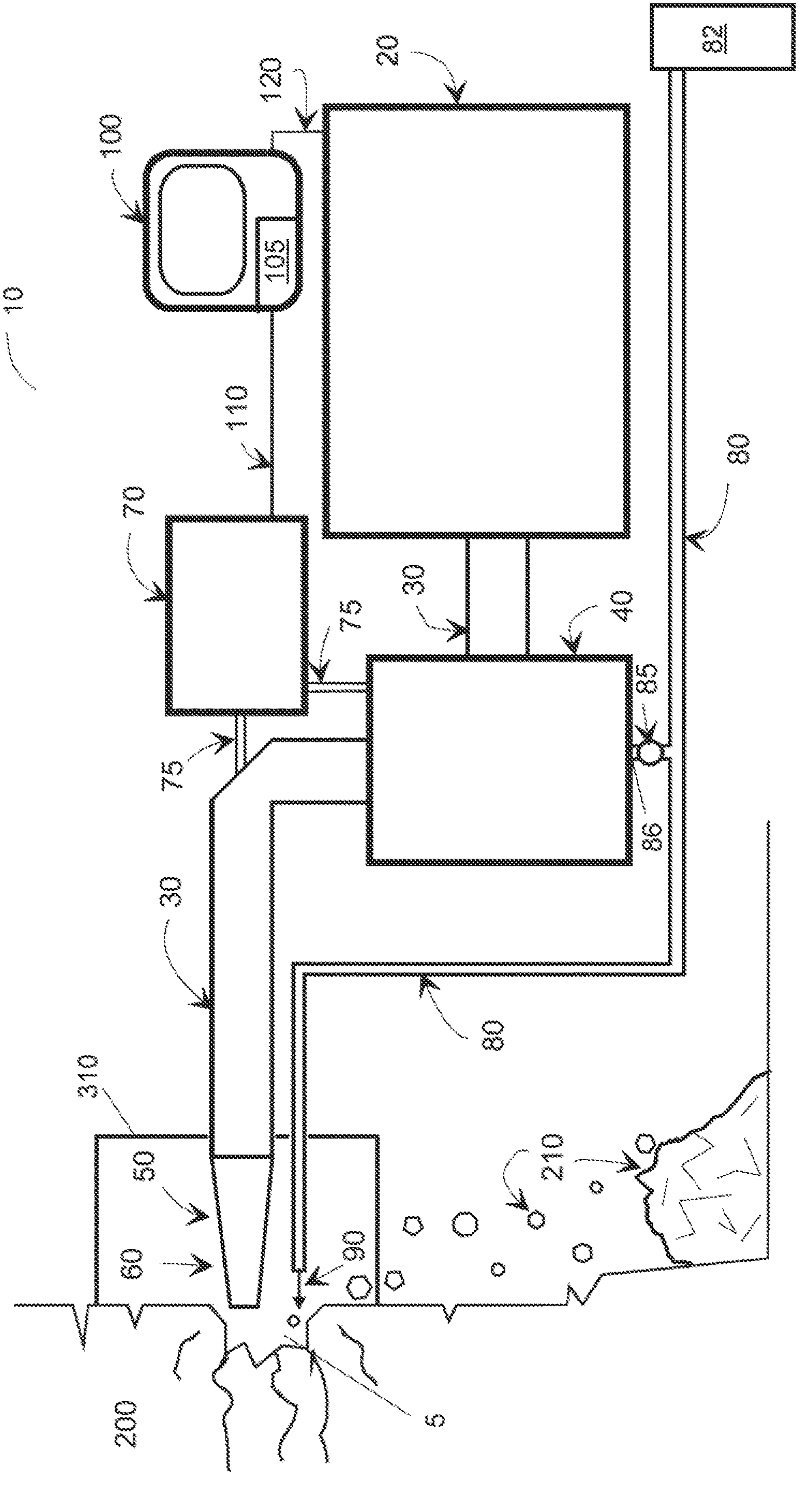
FIG. 3 depicts an MMW excavation system that includes sealing apparatus for pressurizing the excavation site.

A third application is the use of MMW energy to reduce or eliminate the use of chemical explosives in fracturing or removing rock, which is important in rock removal in populated areas. For example, rock could be explosively removed from the earthen material 200 using only the MMW excavation source 10 and no chemical explosives, which can produce harmful gases. In such an application, a seal 310 in FIG. 3 can be formed around the excavation site 5 to create a closed chamber around the excavation site. The seal 310 may comprise a metal shell to confine stray MMW radiation. The chamber may contain small openings to the atmosphere (e.g., where the transmission line 30 and gas flow line 80 pass through the seal 310). Gas injected through the gas flow line 80 can partially pressurize the chamber. Alternatively, the chamber can be pressurized by gas injected into the transmission line via the gas inlet 86. In some cases, the transmission line 30 may not pass through the seal 310. Instead, the excavation beam 60 can pass through an MMW transmissive window in the seal. During rapid heating of the excavation site 5 by the excavating beam 60, the pressure at the excavation site 5 inside the sealed chamber 310 can increase to a value in proportion to the temperature rise in the confined volume as governed by the gas law PV=nRT. For example, if the starting cold pressure induced by gas flow from the transmission line 30 and/or gas flow line 80 is 100 atmospheres, then a temperature rise by a factor of 10 inside seal 310 could increase the pressure to 1,000 atmospheres. The electric field breakdown threshold will increase in approximate proportion to gas molecular number density that corresponds to the pressure rise, which in turn would increase the power intensity that could be brought to bear on the rock surface. This increased power intensity would increase excavation speed. Open or closed loop control of various millimeter wave source parameters, as described above, could be used in such an application. FIG. 3 also shows a tapered distal end 50 of the transmission line 30.

A fourth application is to use the excavation system 10 for selective removal of high value material from a rock face or from loosened rock by local weakening and vaporization. Real-time monitoring of element composition of the rock can be used to control the positioning of the excavation beam 60 and operating characteristics of the MMW source 20. The molecular and/or elemental composition can be measured by infrared or optical spectroscopy of material that is ablated by the MMW excavation beam 60. The characteristics of the excavation beam 60 can be changed on a temporary basis so as to improve the measurement. For example, peak power can be increased to induce atomic emission and/or vaporize the material for analysis. Alternatively, a slip stream of the exhausted vapor and/or particulates from the excavation site 5 can be directed through an analytical chemistry instrument.

A fifth application is using the excavation system 10 to extract precious metals, particularly gold, that often occur in relatively thin seams or so-called reefs. Accessing and excavating the mineral from a thin seam involves a lot of waste-rock as well as very dangerous conditions for the miners. Use of a robotic excavation system 10, combining MMW directed energy and mechanical removal, could reduce cost and improve safety when extracting precious metals from a thin seam.

A sixth application is processing minerals with the excavation system 10. Mineral processing often includes the breakage of rocks into smaller particles followed by chemical treatment, melting, or both. The breakup and reduction in rock size is usually referred to as "comminution," and is typically done mechanically in milling operations. The milling operations can consume a large majority of the energy to extract minerals from the rocks. Such milling operations could be replaced by or combined with MMW treatment using the excavation system 10. For example, the MMW excavation system 10 could be used to further fracture and/or melt removed earthen material transported via a conveyor system for the size reduction and/or melting step.

Conventional mechanical means (e.g., grinding with a grinder or crushing with a rock crusher) and chemical means (e.g., trituration with a solvent or leaching with sulphuric acid) for material size reduction and refining are very inefficient, energy intensive, and can be environmentally harmful. The MMW radiation could be used to weaken and preprocess the rock prior to mechanical and/or chemical treatment and thus enable more efficient and more environmentally-friendly processing. This could lead to a substantial reduction in overall processing cost.

A number of MMW characteristics would be adjusted to increase efficiency for mineral processing. For example, operating parameters can be adjusted to selectively process regions of the removed earthen material where the desired products (such as valuable minerals or precious metals) are localized, thus saving more energy. Adjustable operating parameters include the choice of frequency, CW or pulsed operation, pulse length, pulse repetition rate, peak power level, average power level, and spot or beam size of the excavation beam 60. The parameters would be adjusted depending on the characteristics of the removed earthen material (e.g., percentage composition of a valuable metal or mineral) and the objectives for the MMW weakening (e.g., further fracturing, melting, or vaporizing). Closed loop control using various sensors and/or monitoring instrumentation 70 can be employed to detect the characteristics (such as temperature and composition) of the removed earthen material. Open loop control could also be utilized.

Illustrative MMW generated temperature changes in the earthen material that would be utilized in the size reduction processing step are temperatures in the range of 20 to 1200 degrees Centigrade. The temperature change would be varied based on the processing objectives and the type of earthen material irradiated. If needed, MMW power intensities greater than 10 $kW/cm^2$ could be used to achieve these temperature changes.

An MMW excavation system 10 can be particularly useful for deployment in harsh conditions (e.g., in very cold climates where the soil is frozen) or in applications where there is minimal or no direct human involvement. A robotically controlled excavation system 10 could be mounted on a vehicle with tires or adapted with flanged rail wheels for transport on a railway.

Figure 4A:
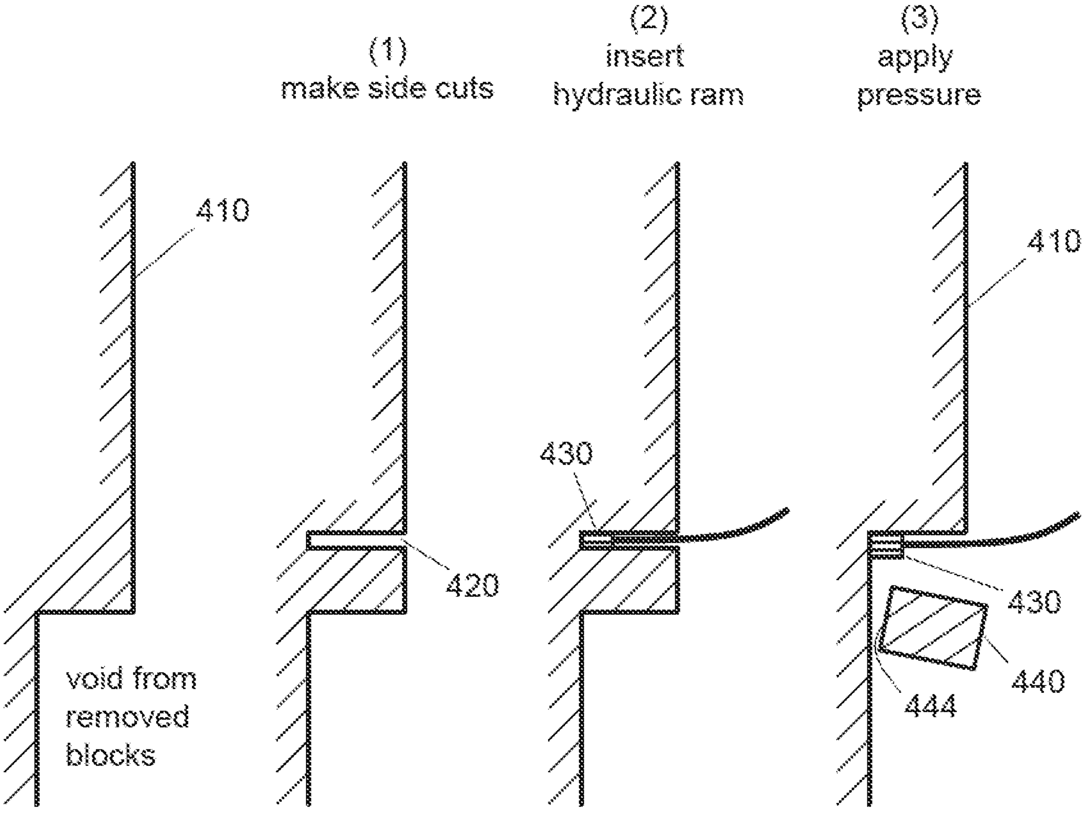
FIG. 4A and FIG. 4B depict steps associated with removal of a block from a rock wall using an MMW excavation system of FIG. 1 or FIG. 3.
Figure 4B:
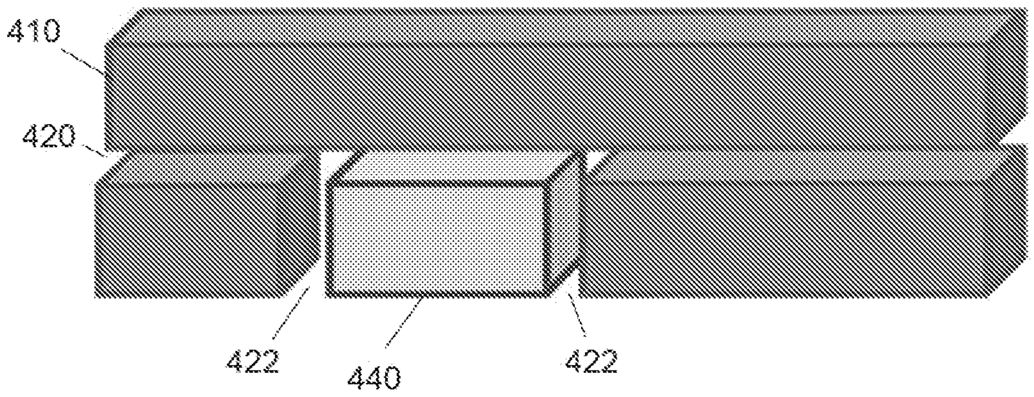

A seventh application is to use the excavation system 10 for block cutting and removal (e.g., in quarrying and excavation processes). Use of the excavation system 10 can reduce energy consumption compared to conventional methods by making only two to four narrow side cuts (or a series of holes) in a solid rock wall that will define edges of the block. FIG. 4A and FIG. 4B depict removal of a block 440 from a rock wall 410. The back face 444 of the block 440 remains attached to the rock wall 410 to hold the block 440 in place until it is broken from the wall. The block 440 can be cracked from the wall, exposing the back face 444, by one or more hydraulic devices 430 (e.g., hydraulic jacks or rams) placed into one horizontal side cut 420, preferably the top cut of the block, or in one or more holes drilled into the rock wall 410. The depth of horizontal side cuts 420, vertical side cuts 422, holes, and the length of each side cut or number of holes are a function of economics and size or weight limits of the handling equipment, breaking force from the hydraulic device(s) 430 and rock strength. Once the block 440 is free, it can be moved by gravity and/or mechanical means (e.g., conveyor belt, trolley or sled system, dragging by cable or chain, etc.) out of the area for further processing, use, or for recycling as fill or construction materials.

The side cuts 420, 422 can be formed as trenches by scanning the excavation beam across the rock wall 410. The width of each trench or side cut can be approximately or exactly equal to the width of the excavation beam 60 at the excavation site 5. In some cases, the width of the side cut can be smaller than the width of the excavation beam 60 at the excavation site 5.

To remove a first block from a solid rock wall (e.g., in a lower corner of the wall), four side cuts 420, 422 can be made. For the first block in each subsequent row of blocks (extending laterally across the wall) or column of blocks (rising vertically up the wall) or holes drilled into the rock wall 410, only three side cuts 420, 422 are sufficient for each block removal since one side of the block to be removed is already exposed to a prior side cut 420, 422 and the void from an adjacent, previously-removed block 440. For the remaining blocks in the rows or columns for which a first block has been removed, only two side cuts 420, 422 are sufficient for block removal since two sides of the block to be removed can already be exposed to prior side cuts 420, 422 and the voids from two adjacent, previously-removed blocks 440. Although FIG. 4A depicts blocks 440 being broken from a bottom of the rock wall 410 to a top of the rock wall, blocks 440 can be removed starting at the top of the rock wall 410. When removed from a top of the rock wall 410, the removed block 440 can fall a short distance and rest on an underlying ledge of the rock wall created by a bottom side cut 420. Depending on the aspect ratio and orientation of the blocks 440 when side cuts 420, 422 are made, the hydraulic device(s) 430 can be placed in a vertical side cut 422 or top side cut 420 to break or sheer the block 440 from the rock wall 410. At least one side cut 420, 422, or portion thereof, should be wide enough for a suitably powerful hydraulic device to be inserted into the cut for cracking the block 440 from the rock wall 410 along the back face 444 of the block.

Figure 5:
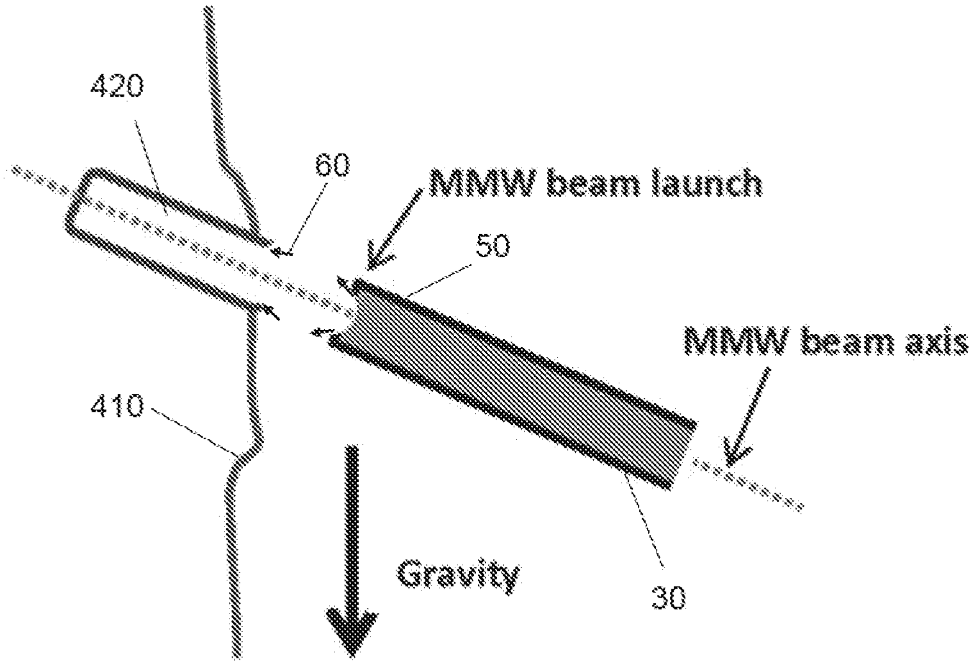
FIG. 5 depicts a modification of a cut direction for excavation or block removal from a vertical rock wall.

FIG. 5 depicts a modification of block removal from a vertical rock wall 410. The side cuts 420, 422 can be made or initiated at a positive angle, upward into the rock wall 410 as depicted. The angular orientation can aid in removal of rock melt before solidifying and aid in removal of fractured particulates. The upward cut angle can be in a range from 2 degrees to 30 degrees.

Variations of block removal methods, in connection with FIG. 4A through FIG. 5, are possible. The side cuts 420, 422 can be formed by rock weakening combined with mechanical removal, rock fracturing, melt, partial vaporization, full vaporization, explosive thermal fracturing, or a combination of these methods. Specifically, some minerals in the rock and all fluids in the pores have lower melting and vaporization temperatures of other components of the rock structure. This can cause differential stress that fractures the rock near the excavation beam 60 and heating point. The resulting stress can reach a level such that the localized rock either melts or fractures into many particles with some imparted velocity from any expanding gases. In a fixed narrow cut, the predominant direction of traveling particles is outward resulting in high velocity particles that can potentially damage the distal end 50 of the transmission line 30, which may include beam launch equipment (such as a mirror, lens, antenna, window, or some combination thereof). The beam launch equipment can be used to collimate or focus the excavation beam 60 at the excavation site 5.

Figure 6:
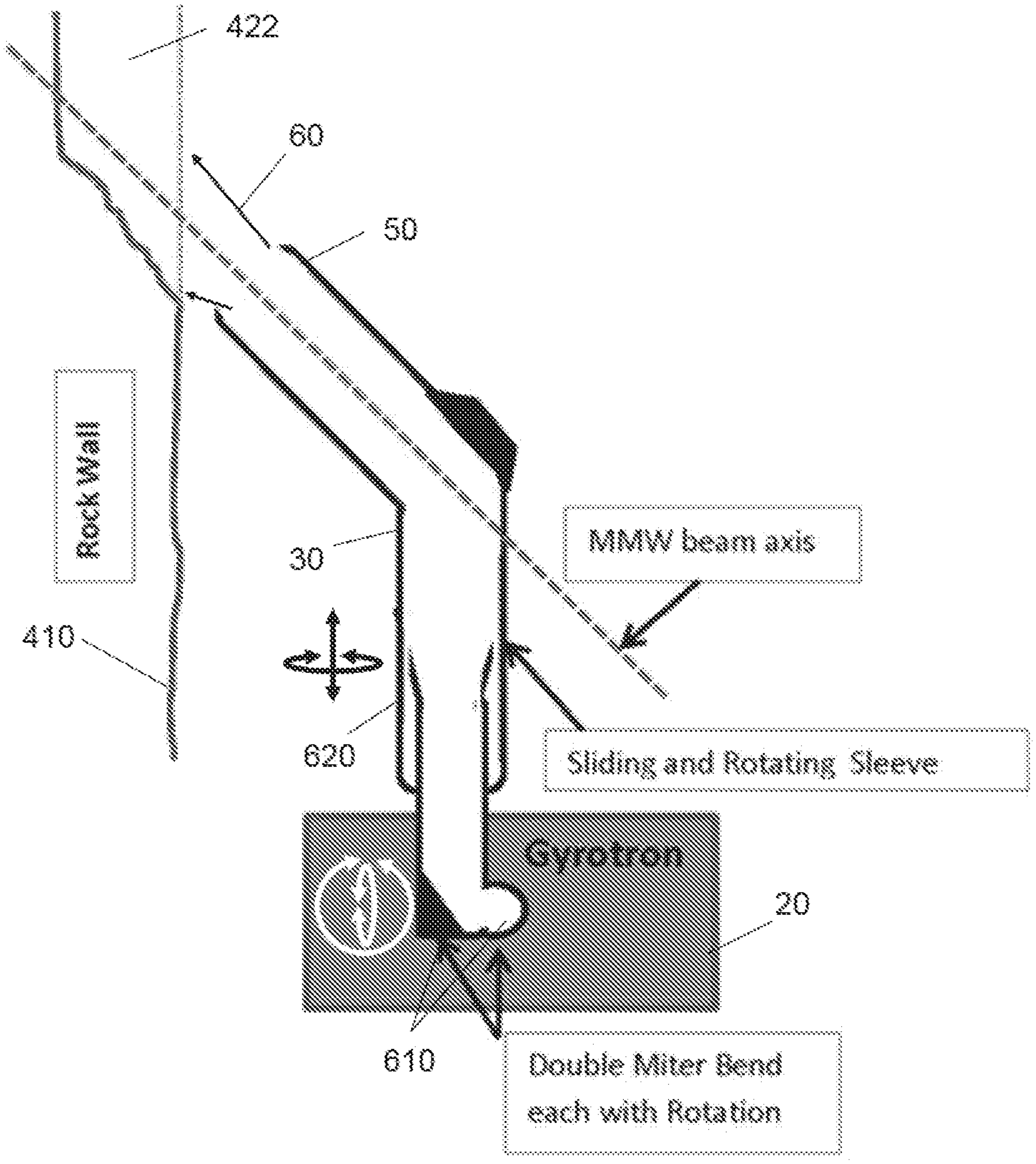
FIG. 6 depicts part of an excavation system that includes portions of the transmission line that allow movement of the distal end of the transmission line with respect to the MMW source and with respect to the earthen material to be excavated.

FIG. 6 depicts an angle of the transmission line 30 and MMW beam axis to the rock wall 410 with some offset distance to prevent potential damage to the excavation system 10. The beam axis can be angled toward a prior side cut 422 or hole and away from the virgin, uncut rock. Advancement of the distal end 50 of the transmission line 30 for side cuts 420, 422 is toward the virgin, uncut rock to allow escaping rock particles to eject into the prior void and reduce ejecting toward the distal end 50 of the transmission line 30. If the distal end 50 is angled upward, the scan direction can be downward for a vertical side cut 422. If the distal end 50 is angled downward, the scan direction can be upward for a vertical side cut 422. For vertical cuts when rock melting is employed, the advancement of the distal end 50 in the downward direction may be desirable to reduce or prevent melt from refilling the cut and solidifying in the cut.

FIG. 6 depicts portions of the transmission line 30 that allow movement of the distal end 50 of the transmission line 30 with respect to the MMW source 20 and rock wall 410 or earthen material without moving the source, as discussed above. The transmission line 30 can include one or more rotatable couplers or rotatable miter bends 610 (that redirect the MMW radiation by a fixed bend angle from 20 degrees to 90 degrees from an incoming beam axis of the incoming transmission line). The rotation of the rotatable coupler or miter bend 610 can be a rotation of the outgoing beam at a fixed bend angle around the incoming beam axis of the incoming transmission line. The transmission line 30 can further comprise one or more sliding sections 620 along the transmission line 30, as shown. The sliding sections (which may also be rotatable) can change a length of the transmission line in which the sliding section 620 is incorporated. The rotatable miter bend(s) 610 and sliding section(s) 620 can allow vertical and horizontal movements as well as angular changes of the distal end 50 of the transmission line 30 with respect to the earthen material 200 without moving the source 20. Such movement and angular changes can be accomplished and controlled by one or some combination of mechanical, electrical, and hydraulic apparatus and methods.

Figure 7:
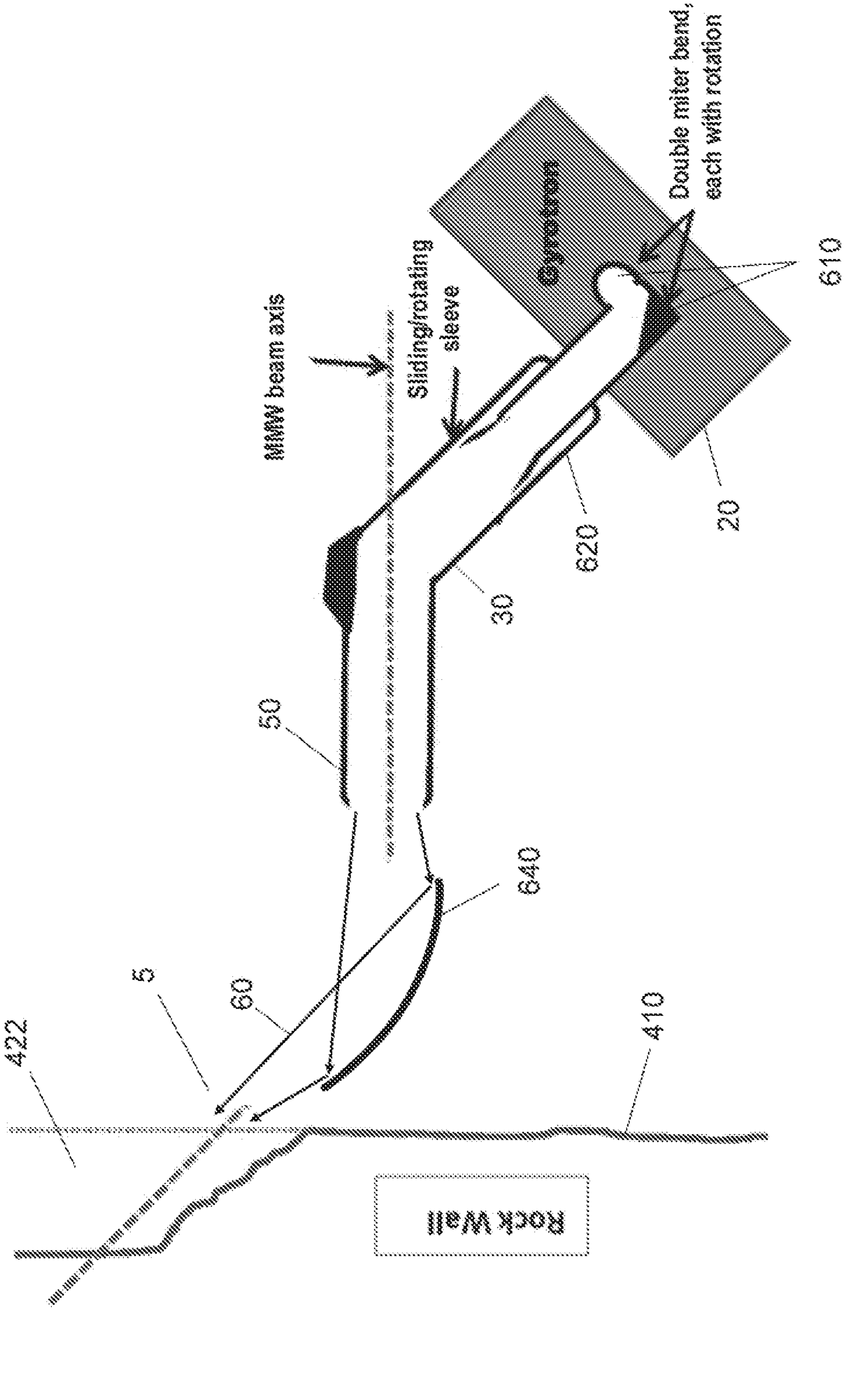
FIG. 7 depicts part of an excavation system of FIG. 6 that further includes a condensing optic.

FIG. 7 shows another approach to excavation that uses a condensing optic 640 (e.g., a parabolic mirror) to focus the excavation beam 60 onto the excavation site 5. Using the mirror can further remove the distal end 50 of the transmission line 30 from the excavation site 5, reducing the potential of damage to the transmission line from ejected debris. The condensing optic 640 and distal end of the transmission line can be arranged in other orientations than shown in FIG. 7. In some cases, the condensing optic can be located above the excavation site 5, so that no downward travelling debris can strike the condensing optic 640.

An eighth application for an MMW excavation system 10 is to melt rock and/or soil for stabilization, strengthening, and/or finishing a rock face or structure. For example, an excavated embankment can have its surface melted and fused together to form a retaining wall that can help prevent collapse of the embankment. An excavated depression can have its surface melted and fused together to allow it to retain water for extended periods of time. An excavated tunnel or borehole can have its surface melted and fused together to form a finished wall and/or ceiling with improved strength and prevention of water flow into the tunnel or borehole. A block 440 removed from a rock wall can have its surfaces melted to provide smooth and stronger finished surfaces of the block.

A ninth application for an MMW excavation system 10 is to melt rock or earthen material at the excavation site 5 to seal off or block fluid flow paths in the rock or earthen material. Sealing the excavated surface can be done by forcing the created melt into the void spaces of rocks or earthen material (e.g., using a pressurized chamber described above in connection with FIG. 3 or using gravity). The pressure from the pressurized chamber can force the melt into the void spaces. The void spaces can include rock pores, fractures, karst features, bored holes, fissures, cavities, etc. in and/or on the exposed rock surface or earthen material. Gravity can be used to form the seal on bottom, floor, and/or horizontal surfaces that may have inclinations up to 45 degrees or more, since molten earthen material can solidify quickly when flowing onto cooler, solid material. Methods of sealing excavated surfaces can be useful when excavating under bodies of water or in wet areas to make the wall, ceiling, and bottom surfaces of the tunnel or borehole impervious to water flow through the sealed surfaces. Overpressure of an enclosed space while applying the MMW excavation beam 60 for melting can create a pressure differential that creates a force on the melt in the direction from the pressurized space into the rock pores to overcome hydraulic pore pressures. This can be very useful in tunneling where water influx is a concern.

Where insufficient or inappropriate melt (such as limestone) is available from the excavated earthen material, the melt can be supplemented with specific additives that have the properties desired to produce a vitrified sealed wall. The additive(s) can be introduced in fine granular or powered form by a pipe adjacent to the transmission line 30 or via the gas flow line 80. For example, the gas input and additive material could be combined into and supplied through the gas flow line 80. In another method, the additive(s) could be introduced in at least one fiber cable, similar to those used in 3D printing but on a larger scale, which is supplied continuously to the excavation site 5 when the MMW excavation beam 60 is active. The additives can include low-temperature melt materials with high MMW absorption for reducing the viscosity of the melt to improve flow into the earthen wall, relative to the earthen materials to be excavated and melted. The additives can include boron or barium compounds, thermo-plastics, metals, or natural minerals, such as pure quartz, potassium feldspar, sodium plagioclase, micas-all of which melt at about 600° C. In some implementations, the additive(s) can have higher thermal conductivity than the native earthen material to improve heat flow and heating of the native earthen material. In some cases, the additive(s) can reduce reflection of the MMW radiation from the melt/surface interface at the excavation site 5.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for excavating earthen material, the system comprising:

a millimeter-wave (MMW) source configured to generate and output MMW radiation having a free-space wavelength in a range from 0.1 millimeter (mm) to 30 mm;

a transmission line, coupled to the MMW source, to guide the MMW radiation to an excavation site having the earthen material and to launch the guided MMW radiation as an excavation beam from a distal end of the transmission line into the earthen material;

a gas inlet coupled to the transmission line to inject a gas into the transmission line and pressurize the excavation site; and sealing apparatus to form a chamber enclosing the distal end of the transmission line and the excavation site such that the excavation site can be pressurized, wherein the MMW source and the transmission line are configured to deliver at least 10 $kW/cm^2$ of the MMW radiation in the excavation beam to the excavation site such that the earthen material at the excavation site is at least fractured by the excavation beam, and wherein the MMW source and/or the transmission line are further configured to move the distal end of the transmission line in a first direction that is perpendicular to a second direction in which the excavation beam propagates to the excavation site.

2. The system of claim 1, wherein the MMW source and the transmission line are further configured to deposit a majority of energy from the excavation beam into the earthen material in an area greater than 1 $cm^2$ but not greater than 100 $cm^2$ and to a depth from 0.1 cm to 20 cm.

3. The system of claim 1, further comprising mechanical apparatus to remove the earthen material fractured by the excavation beam from the excavation site.

4. The system of claim 3, wherein the mechanical apparatus is configured to produce pressurized gas to blow at least a portion of the earthen material fractured by the excavation beam and/or melted earthen material from the excavation site.

5. The system of claim 1, wherein the transmission line further comprises at least one moveable portion to scan the excavation beam laterally and/or vertically with respect to the earthen material without moving the MMW source.

6. The system of claim 1, wherein the MMW source is further configured to output the MMW radiation in a series of pulses.

7. The system of claim 1, further comprising a mirror to focus the excavation beam from the distal end of the transmission line onto the excavation site.

8. The system of claim 1, wherein the distal end of the transmission line is tapered from a larger diameter to a smaller diameter at the distal end.

9. A method of excavating earthen material, the method comprising:

generating, with a millimeter-wave (MMW) source, MMW radiation having a free-space wavelength in a range from 0.1 mm to 30 mm;

coupling the MMW radiation to a transmission line;

guiding, with the transmission line, the MMW radiation to an excavation site having the earthen material;

forming an excavation beam from the MMW radiation at a distal end of the transmission line;

illuminating the earthen material at the excavation site with the excavation beam at an irradiance of at least 10 $kW/cm^2$;

fracturing the earthen material at the excavation site with the excavation beam;

removing, with mechanical apparatus, the earthen material fractured by the excavation beam from the excavation site;

forming a chamber to enclose the distal end of the transmission line and the excavation site; and injecting gas into the chamber such that the excavation site is pressurized.

10. The method of claim 9, further comprising:

depositing a majority of energy from the excavation beam into the earthen material at the excavation site in an area greater than 1 $cm^2$ but not greater than 100 $cm^2$ and to a depth from 0.1 cm to 20 cm into the earthen material.

11. The method of claim 9, further comprising delivering energy from the excavation beam to the earthen material at the excavation site to increase pressurization of the excavation site to a pressure level that is 10 times or more than local ambient pressure outside the chamber.

12. The method of claim 9, further comprising moving the distal end of the transmission line with respect to the earthen material without moving the MMW source.

13. The method of claim 9, further comprising reflecting the excavation beam from a mirror to focus the excavation beam at the excavation site.

14. The method of claim 9, wherein removing the earthen material fractured by the excavation beam comprises blowing at least a portion of the earthen material fractured by the excavation beam and/or any melted earthen material from the excavation site with pressurized gas.

15. The method of claim 9, further comprising delivering an additive to the excavation site to reduce a viscosity of melted earthen material flowing at the excavation site and improve liquid flow of the melted earthen material.

16. A method of excavating earthen material, the method comprising:

generating, with a millimeter-wave (MMW) source, MMW radiation having a free-space wavelength in a range from 0.1 mm to 30 mm;

coupling the MMW radiation to a transmission line;

guiding, with the transmission line, the MMW radiation to an excavation site having the earthen material;

forming an excavation beam from the MMW radiation at a distal end of the transmission line;

illuminating the earthen material at the excavation site with the excavation beam at an irradiance of at least 10 $kW/cm^2$;

fracturing the earthen material at the excavation site with the excavation beam;

forming a trench in the earthen material with the excavation beam;

inserting a mechanical hydraulic device into the trench; and breaking a portion of the earthen material from the trench with the mechanical hydraulic device.

17. The method of claim 16, further comprising:

moving the distal end of the transmission line with respect to the earthen material without moving the MMW source.

18. The method of claim 16, further comprising:

depositing, by the MMW source and the transmission line, a majority of energy from the excavation beam into the earthen material in an area greater than 1 $cm^2$ but not greater than 100 $cm^2$ and to a depth from 0.1 cm to 20 cm.

19. The method of claim 16, further comprising:

outputting, by the MMW source, the MMW radiation in a series of pulses.

20. The method of claim 16, further comprising reflecting the excavation beam from a mirror to focus the excavation beam at the excavation site.

* * * * *